(12) United States Patent
Koshiyama et al.

(10) Patent No.: US 6,226,434 B1
(45) Date of Patent: *May 1, 2001

(54) CLOSURE FOR CABLE CONNECTION

(75) Inventors: Koji Koshiyama, Saitama; Tadashi Hattori; Yasunari Tsuruta, both of Tokyo; Tetsuo Nozawa, Chiba; Yasuhiro Tamaki, Chiba; Hiroshi Yokosuka, Chiba, all of (JP)

(73) Assignees: Japan Recom Ltd.; Fujikara Ltd., both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,238

(22) Filed: Apr. 10, 1997

(30) Foreign Application Priority Data

May 14, 1996 (JP) .................................................. 8-142351

(51) Int. Cl.[7] ........................................................ G02B 6/00
(52) U.S. Cl. ............................ 385/134; 385/95; 385/135; 174/65; 174/92
(58) Field of Search ..................................... 385/134, 135, 385/95; 174/92, 65, 35, 41

(56) References Cited

U.S. PATENT DOCUMENTS

| | | | |
|---|---|---|---|
| 4,390,744 | * | 6/1983 | Suffi et al. ............................... 174/41 |
| 4,754,876 | * | 7/1988 | Noon et al. ........................... 385/135 |
| 4,805,979 | * | 2/1989 | Bossard et al. ....................... 385/135 |
| 4,820,007 | * | 4/1989 | Ross et al. ............................ 385/135 |
| 4,861,134 | * | 8/1989 | Alameel et al. ...................... 385/135 |
| 4,927,227 | * | 5/1990 | Bensel, III et al. .................. 385/135 |
| 4,932,744 | * | 6/1990 | Messelhi .............................. 385/135 |
| 4,933,512 | * | 6/1990 | Nimiya et al. .......................... 174/92 |
| 5,005,941 | * | 4/1991 | Barlow et al. ........................ 385/135 |
| 5,080,459 | * | 1/1992 | Wettengel et al. ...................... 385/95 |
| 5,509,099 | * | 4/1996 | Hermsen et al. ..................... 385/134 |
| 5,596,670 | * | 1/1997 | Debortoli et al. .................... 385/135 |
| 5,631,993 | * | 5/1997 | Cloud et al. .......................... 385/135 |

* cited by examiner

*Primary Examiner*—Rodney Bovernick
*Assistant Examiner*—Ellen E. Kim
(74) *Attorney, Agent, or Firm*—Lerner, David, Littenberg, Krumholz & Mentlik, LLP (57) ABSTRACT

A closure for cable connection which is capable of preventing deformation thereof, facilitating incorporation and setting of a cable therein, exhibiting increased safety and airtightness, and attaining sleeve assembling and cable connection with improved workability. A sleeve is provided therein with a cable connection mechanism including a cable clamp, a tension member holder, and a fiber cable storage casing in which a fiber connection section of cable fibers and an excessive fiber are received. The sleeve is provided on upper and lower portions of an inner surface thereof with connection fitment mounting sections, on which a frame-like connection fitment for mounting the cable connection mechanism thereon is detachably fittedly fixed.

25 Claims, 11 Drawing Sheets

CLOSURE FOR CABLE CONNECTION

BACKGROUND OF THE INVENTION

This invention relates to a closure for protection of a connection section or splicing section of a communication cable such as an optical fiber cable or the like, and more particularly to an improvement in a cable closure for connection of an optical fiber cable.

In general, a closure for cable connection which has been typically applied to such a purpose includes a cable receiving structure for protection of a connection section of a cable. The cable receiving structure includes end plates through which a cable is inserted and a cylindrical sleeve formed so as to receive the cable connection section therein while covering it and constructed so as to be split in a longitudinal direction thereof. Two lengthwise split parts of the sleeve arranged between the end plates in a manner to be opposite to each other are joined together through abutting portions thereof opposite to each other using any suitable fixing means such as screws or the like, resulting in providing the sleeve for airtightly or water-tightly protecting the cable connection section.

The conventional cable closure thus formed is required to exhibit rigidity sufficient to prevent deformation of the sleeve and properties sufficient to prevent intrusion of moisture thereinto. For this purpose, the sleeve is so constructed that components or parts therefor are closely or tightly coupled to each other and coupling between the cable and the sleeve is likewise tightly carried out. Unfortunately, such construction of the conventional sleeve causes setting and handling of the cable led out of the end plates to be substantially troublesome, when branching of the cable, lead-in thereof, connection thereof or the like is desired. Also, in order that the conventional sleeve ensures sufficient connection and fastening of the cable, it is rendered complicated in structure and expensive due to troublesome manufacturing thereof. Further, the sleeve fails to exhibit satisfactory durability. In addition, the conventional cable closure is provided with a tray guide for receiving a connection section of a cable fiber and an excessive fiber of the cable fiber therein, which is formed by stacking a plurality of receiving trays on each other. Unfortunately, handling of the receiving trays each having the cable fiber received therein and assembling and disassembling of the tray guide are highly troublesome, because a number of tools are required therefor and the tray guide is extensively complicated in structure.

SUMMARY OF THE INVENTION

The present invention has been made in view of the foregoing disadvantage of the prior art.

Accordingly, it is an object of the present invention to provide a closure for cable connection which is capable of effectively preventing deformation of a sleeve.

It is another object of the present invention to provide a closure for cable connection which is capable of facilitating incorporation and setting of a cable therein.

It is a further object of the present invention to provide a closure for cable connection which is capable of satisfactorily exhibiting increased safety and airtightness.

It is still another object of the present invention to provide a closure for cable connection which is capable of exhibiting highly improved workability in assembling of a sleeve.

It is a still further object of the present invention to provide a closure for cable connection which is capable of accomplishing connection of a cable substantially without requiring tools and skill, to thereby carry out cable connection with highly improved workability.

In accordance with the present invention, a closure for cable connection is provided. The closure includes a sleeve of a cylindrical shape into which a cable is introduced, a cable connection mechanism arranged in the sleeve to carry out connection and fixing of the cable, and a connection fitment which is arranged in the sleeve and on which the cable connection mechanism is mounted. The sleeve is provided on an inner surface thereof with a plurality of connection fitment mounting sections and the connection fitment is detachably fittedly fixed on the connection fitment mounting sections.

The closure for cable connection is so constructed that the sleeve is opened at joint edges thereof and the connection fitment is forced in the connection fitment mounting sections provided on upper and lower portions of the inner surface of the sleeve. Such construction permits the connection fitment to be mounted in the sleeve by a one-touch operation. The connection fitment is mounted thereon with a tray fixing stand base, on which fiber cable storage casings are detachably securely mounted. The connection fitment permits the sleeve to be reinforced over a whole length thereof, resulting in preventing deformation of the sleeve to provide the closure with increased safety and reliability.

The closure may be assembled by inserting a cable through the end plates thereinto to connect it to the cable connection mechanism, pivotally moving one side of the sleeve about a hinge to cover the end plates therewith while forcing it against the end plates, and engaging the joint edges with each other while pressing both sides of the sleeve against each other. Also, release of connection between the joint edges of the sleeve permits at least one side of the sleeve to be readily developed about the hinge to open the sleeve, to thereby facilitate a cable connection operation.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a closure for cable connection according to the present invention will be described hereinafter with reference to the accompanying drawings.

Figure 3:
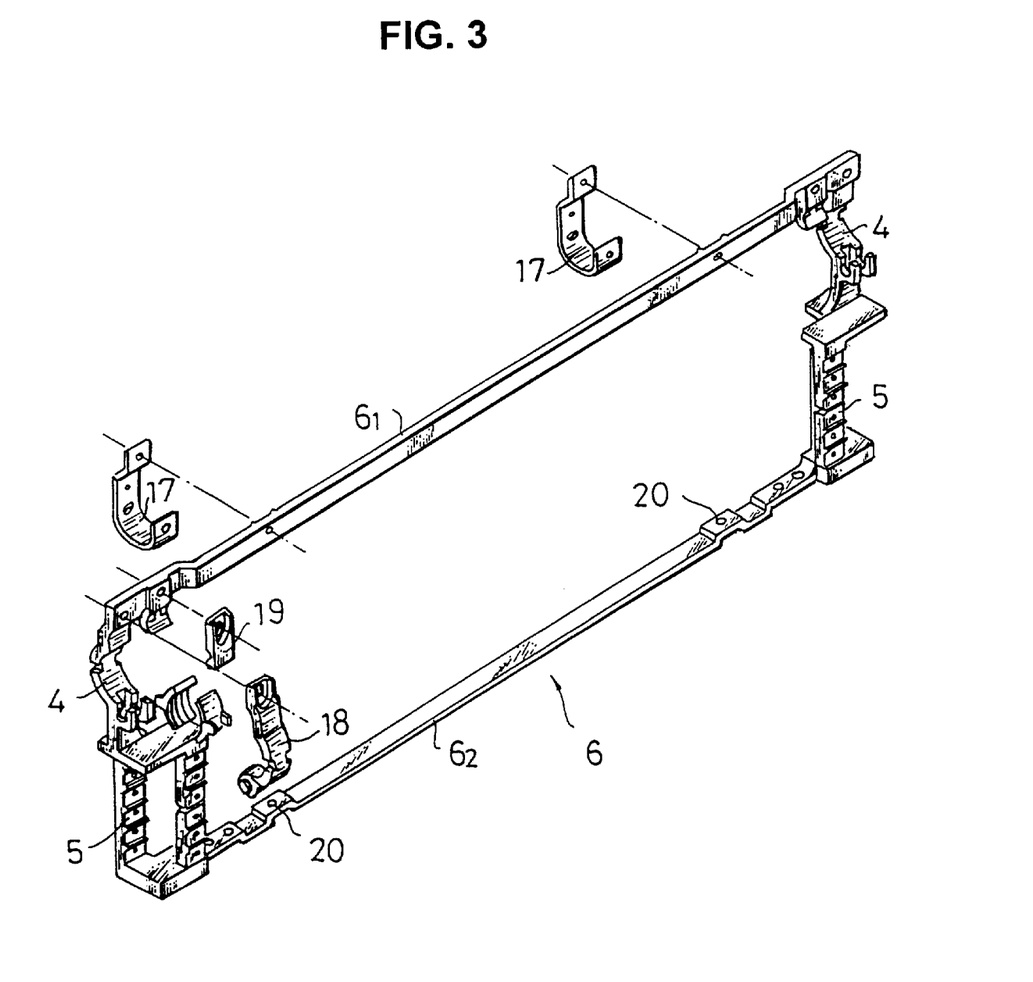
FIG. 3 is an exploded perspective view showing a connection fitment incorporated in the closure shown in FIG. 1.
Figure 4:
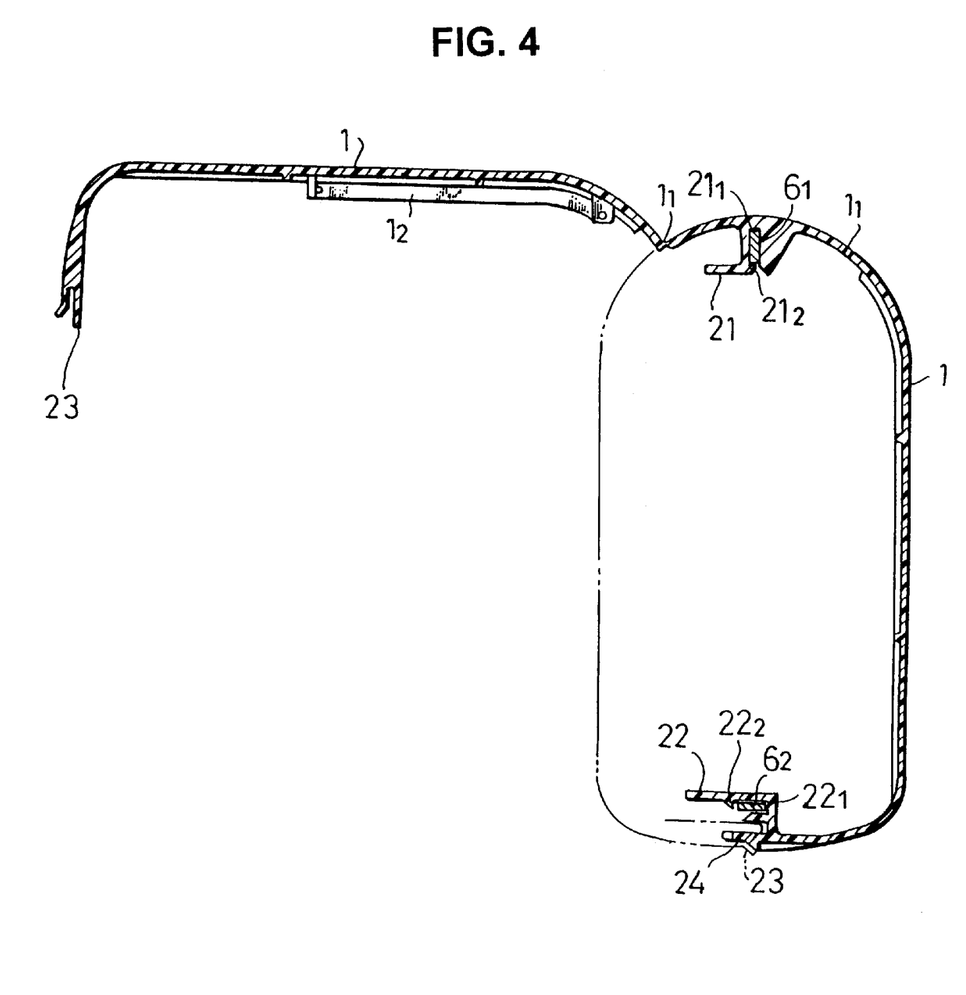
FIG. 4 is a developed vertical sectional view showing a sleeve incorporated in the cable connection closure shown in FIG. 1.

Referring to FIGS. 1 to 14, an embodiment of a closure for cable connection according to the present invention is illustrated, which generally includes a sleeve 1 of a cylindrical shape and end plates 3 fittedly mounted on respective end fit sections 2 of the sleeve 1. The end plates 3 are each adapted to permit a trunk optical fiber cable A to be inserted therethrough, which is then fixed with respect to the end plates 3 by means of cable clamps 4. Drop cables B for the trunk optical fiber cable A include respective tension members C. The tension members C are connected to tension member holders 5. The sleeve 1 is constructed in the form of a cylindrical housing, which may be integrally made of a synthetic resin material such as, for example, PP resin, fire retardant FRPP resin filled with glass fiber, a thermoplastic elastomer or the like. Also, the sleeve 1 is constructed of two halves or parts formed by splitting the sleeve 1 in an axial or longitudinal direction thereof at one part thereof in a circumferential direction thereof, so that the two parts may be formed with joint edges through which the parts are jointed to each other. In the illustrated embodiment, the sleeve 1 is split at a bottom thereof. The sleeve 1 is also formed on an upper end thereof opposite to the joint edges with two hinges $1_1$ so as to extend in the longitudinal direction thereof, through which the sleeve 1 may be expanded on both sides thereof and closed and fastened at the joint edges by a one-touch operation, as desired. The sleeve 1, as shown in FIG. 4, is provided on an inner surface thereof with an expanded sleeve restriction member $1_2$. The end plates 3 are each fittedly mounted on a corresponding one of the end fit sections 2 formed on both ends of the sleeve 1. The end plate 3 may be made of a plate-like rubber material such as EPDM or the like which is increased in various characteristics such as weather resistance, ozone resistance and the like. Also, the sleeve 1 is integrally formed on the inner surface thereof with a pair of first connection fitment mounting sections 21 and a pair of second connection fitment mounting sections 22, which are constructed so as to permit a connection fitment 6 to be readily fitted therein by a simple operation such as press fitting or insertion, to thereby facilitate assembling of the sleeve 1. Further, the sleeve 1 is provided on the joint edges thereof with mutual fit engagements 23 and 24 through which the joint edges of the sleeve 1 are selectively locked together to close the sleeve 1. Thus, the sleeve 1 is permitted to be free from any separate bottom plate.

Figure 2:
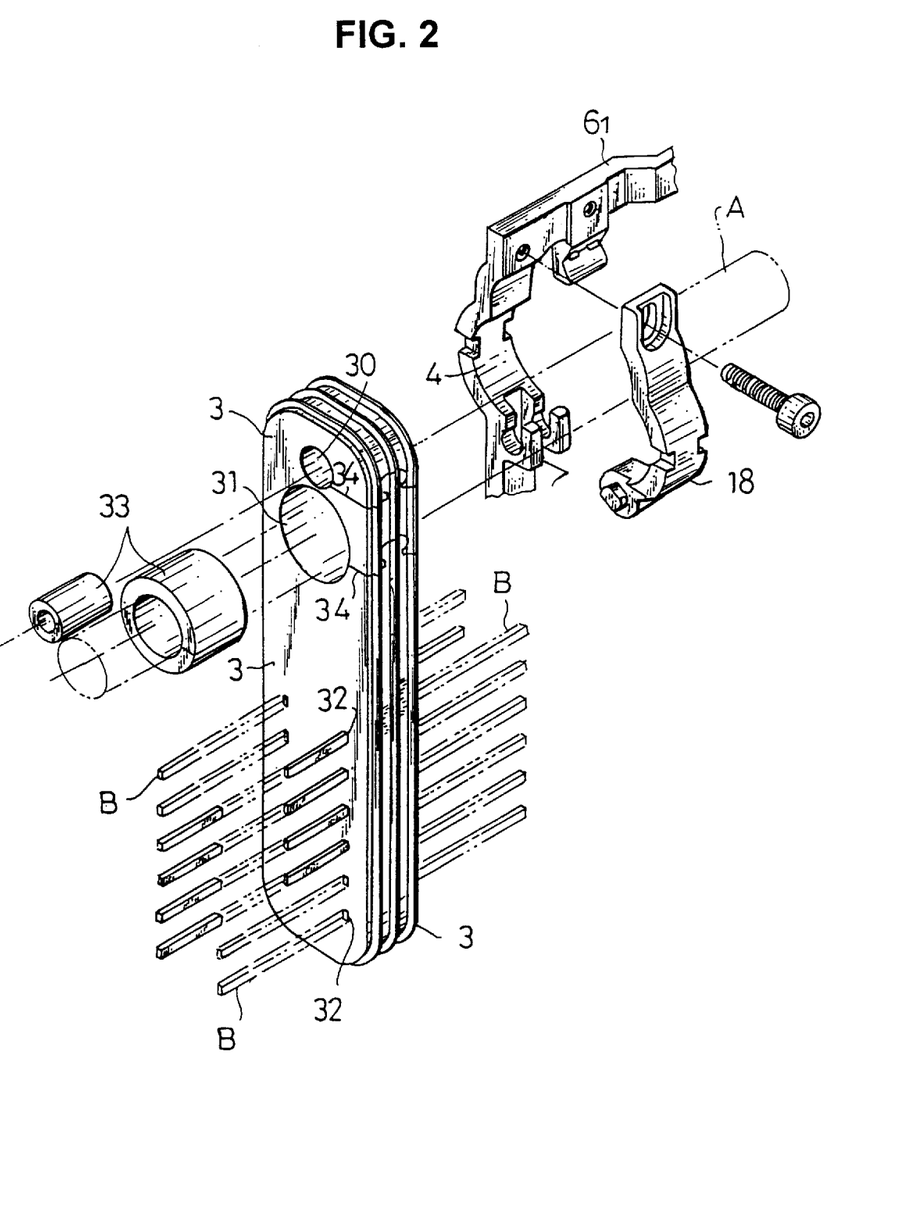
FIG. 2 is an exploded perspective view showing an end plate incorporated in the closure shown in FIG. 1.

The end plates 3, as shown in FIG. 2, are each formed with a support wire insertion hole 30 and a cable insertion hole 31, as well as insertion holes 32 for the drop cables B. The support wire insertion hole 30 and cable insertion hole 31 are provided with respective slits 34. The holes 30 and 31 may each be fitted therein with an adapter 33, resulting in carrying out lead-in and lead-out of the cable and wire or access thereof with respect to the sleeve 1 while ensuring sealing between the sleeve and the cable or wire.

The closure of the illustrated embodiment also includes a plurality of fiber cable storage casings 7 arranged in the sleeve 1. The fiber cable storage casings 7 are each provided therein with lower and upper connector holders 8 in which connectors for connection of cable fibers such as, for example, connectors of the mechanical splice type and a subunit or cassette 28 having a plurality of connectors received therein are heldly received, respectively, as well as an excessive fiber receiver 9 for receiving therein an excessive fiber of each of cable fibers led out of the connectors received in the connector holders 8 while winding it in a loop-like manner. Thus, the fiber cable storage casing 7 is adapted to receive at least one connection section or splicing section of each cable fiber and at least one excessive fiber therein.

Figure 6:
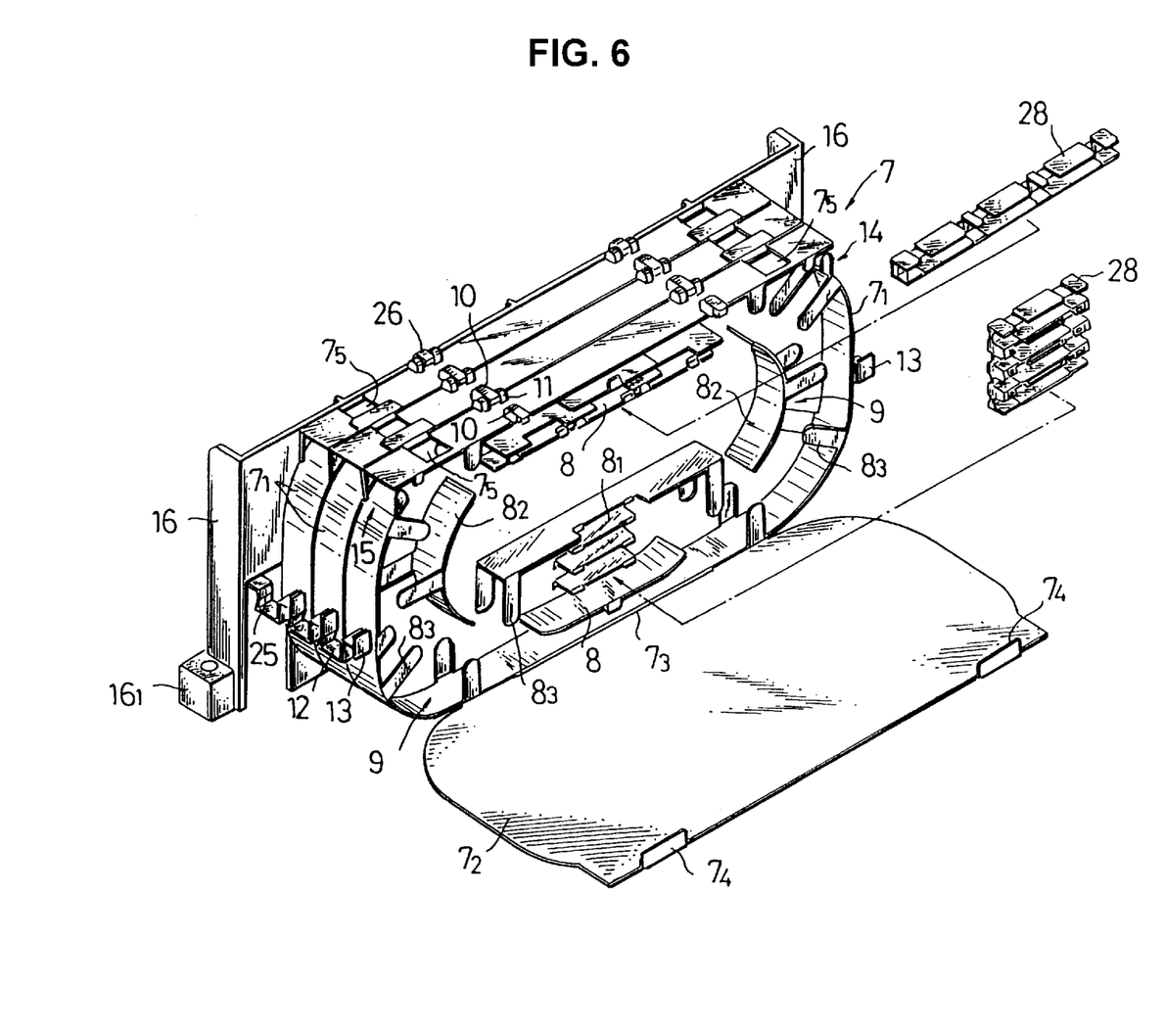
FIG. 6 is a perspective view showing fiber cable storage casings incorporated in the closure shown in FIG. 1 while being partially developed.
Figure 7A:
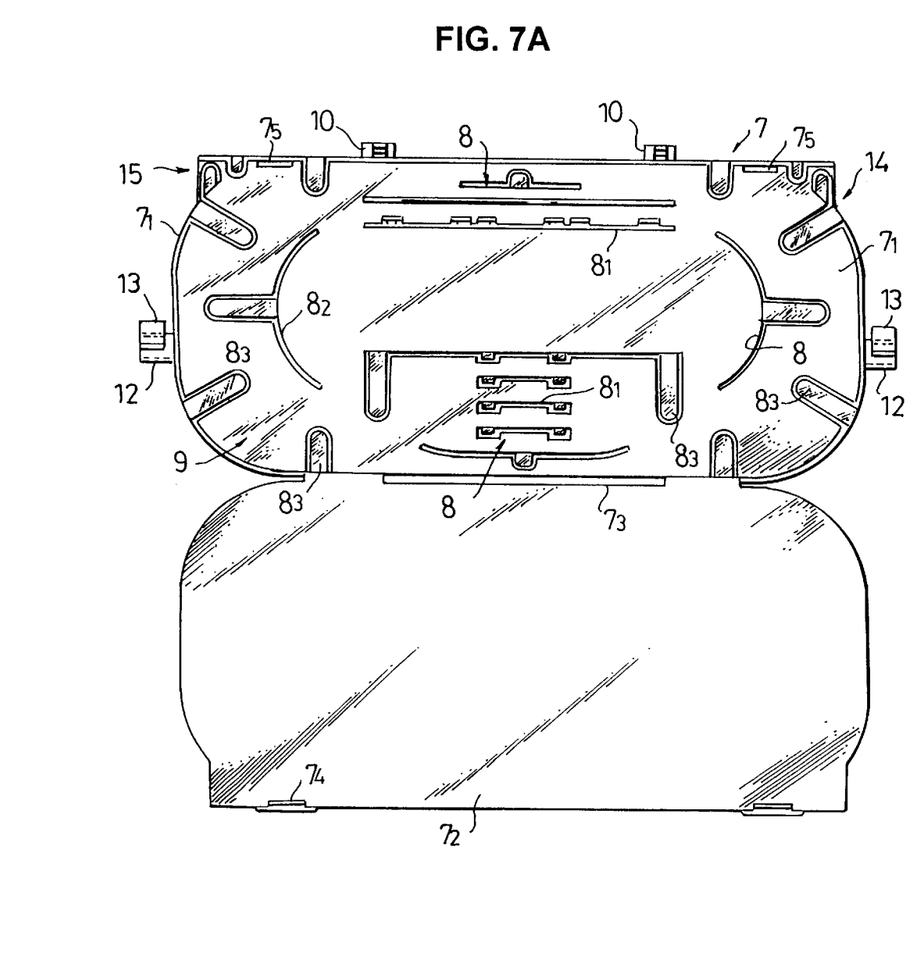
FIG. 7A is a front elevation view of the fiber cable storage casing shown in FIG. 6 while keeping a cover thereof open.
Figure 7B:
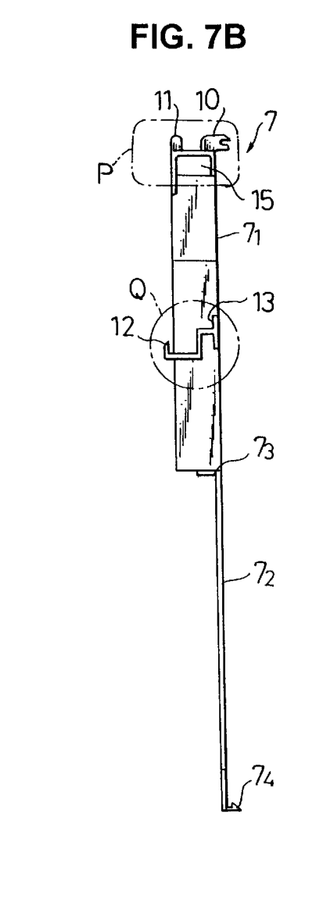
FIG. 7B is a side elevation view of the fiber cable storage casing shown in FIG. 7A.
Figure 8A:
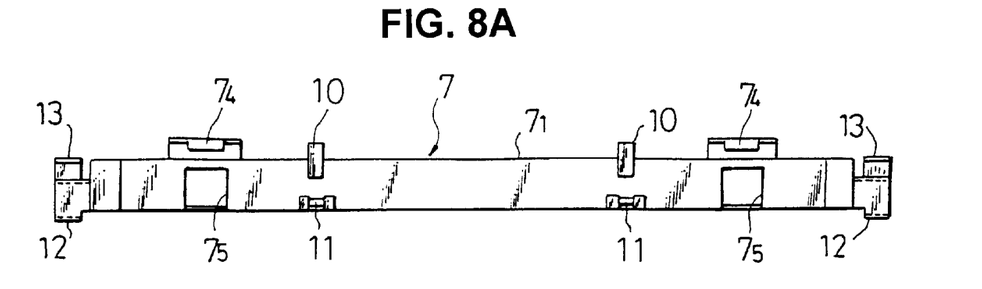
FIG. 8A is a plan view showing an appearance of the fiber cable storage casing shown in FIGS. 7A and 7B.
Figure 8B:
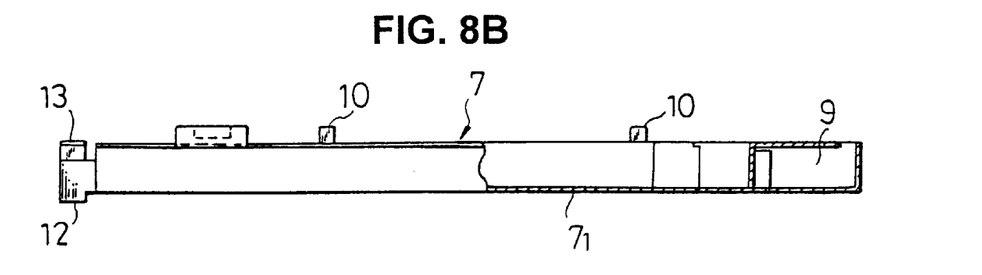
FIG. 8B is a bottom view partly in section of the fiber cable storage casing shown in FIG. 8A.
Figure 9A:
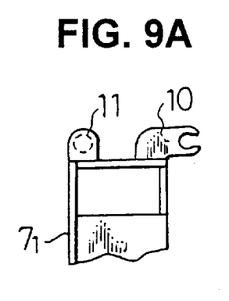
FIGS. 9A and 9B are an enlarged side elevation view and an enlarged plan view each detailedly showing a portion indicated at P in FIG. 7B, respectively.
Figure 9B:
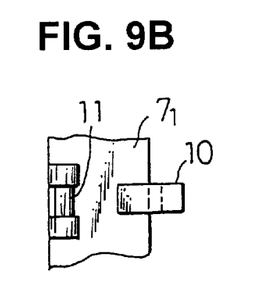
Figure 10A:
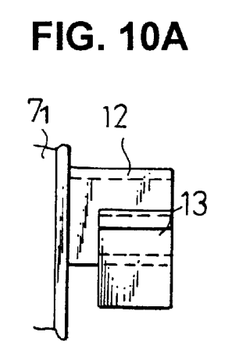
FIGS. 10A and 10B are an enlarged side elevation view and an enlarged front elevation view each detailedly showing a portion indicated at Q in FIG. 7B, respectively.
Figure 10B:
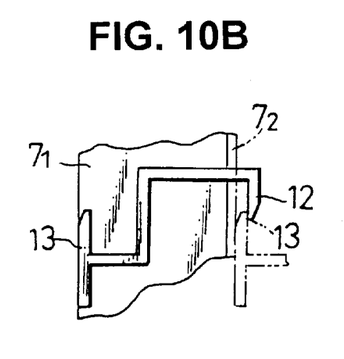
Figure 11A:
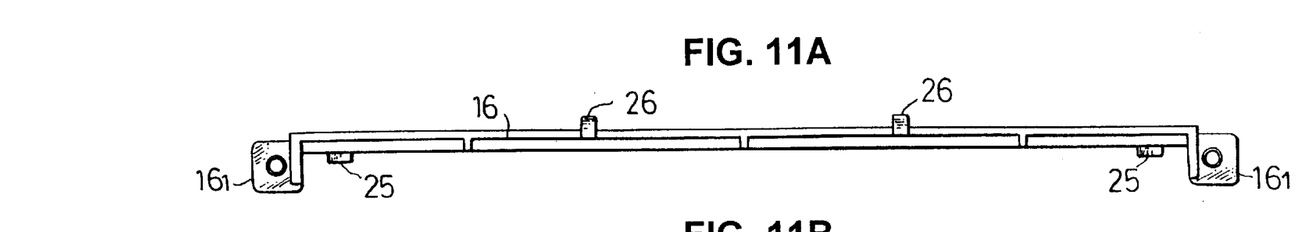
FIGS. 11A, 11B and 11C are a plan view, a front elevation view and a bottom view each showing a tray fixing stand base incorporated in the closure shown in FIG. 1, respectively.
Figure 11B:
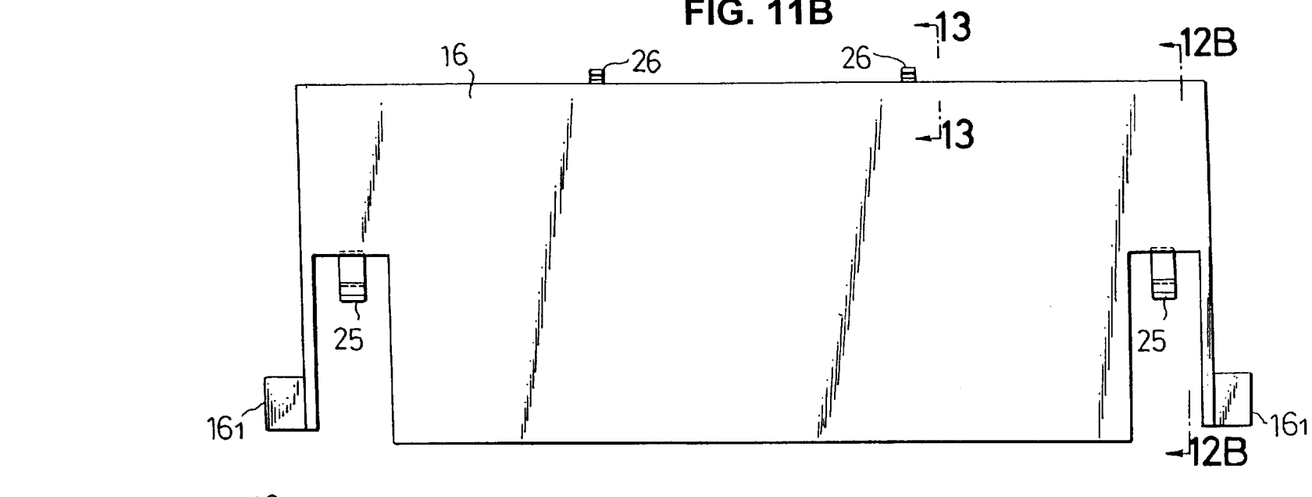
Figure 11C:
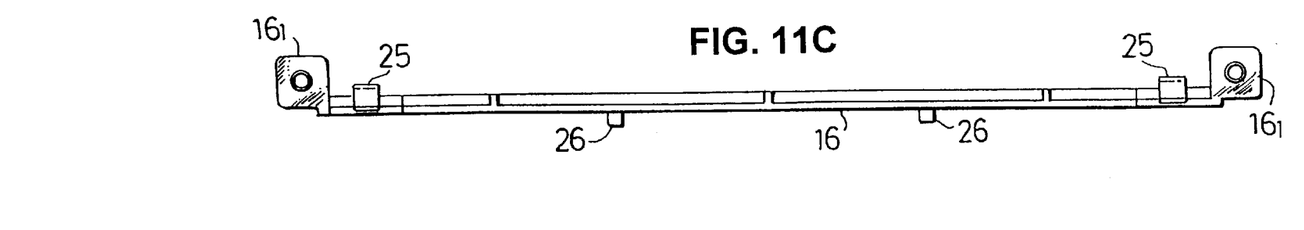
Figure 12A:
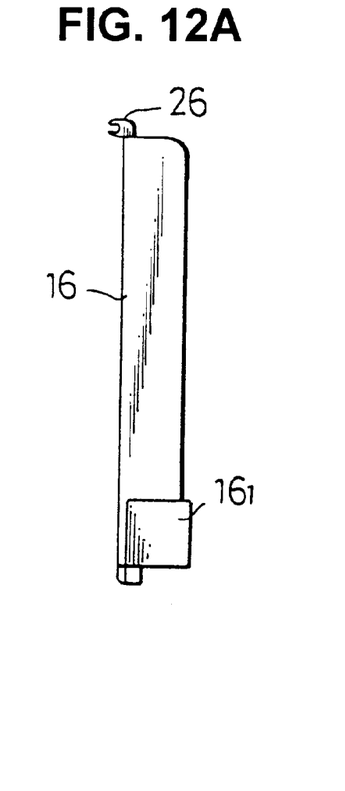
FIG. 12A is a side elevation view of the tray fixing stand base shown in FIGS. 11A to 11C.
Figure 12B:
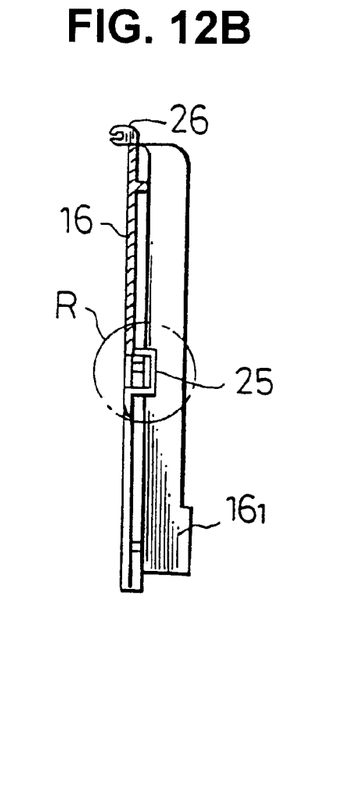
FIG. 12B is a sectional side elevation view taken along line 12B—12B of FIG. 11B.
Figure 13:
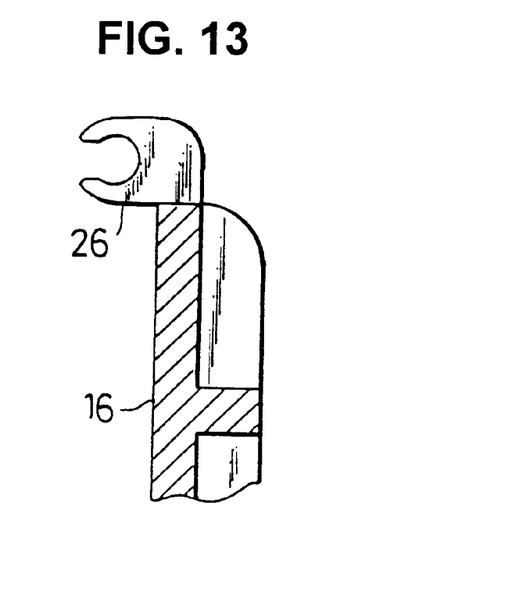
FIG. 13 is an enlarged vertical sectional view taken along line 13—13 of FIG. 11B.
Figure 14:
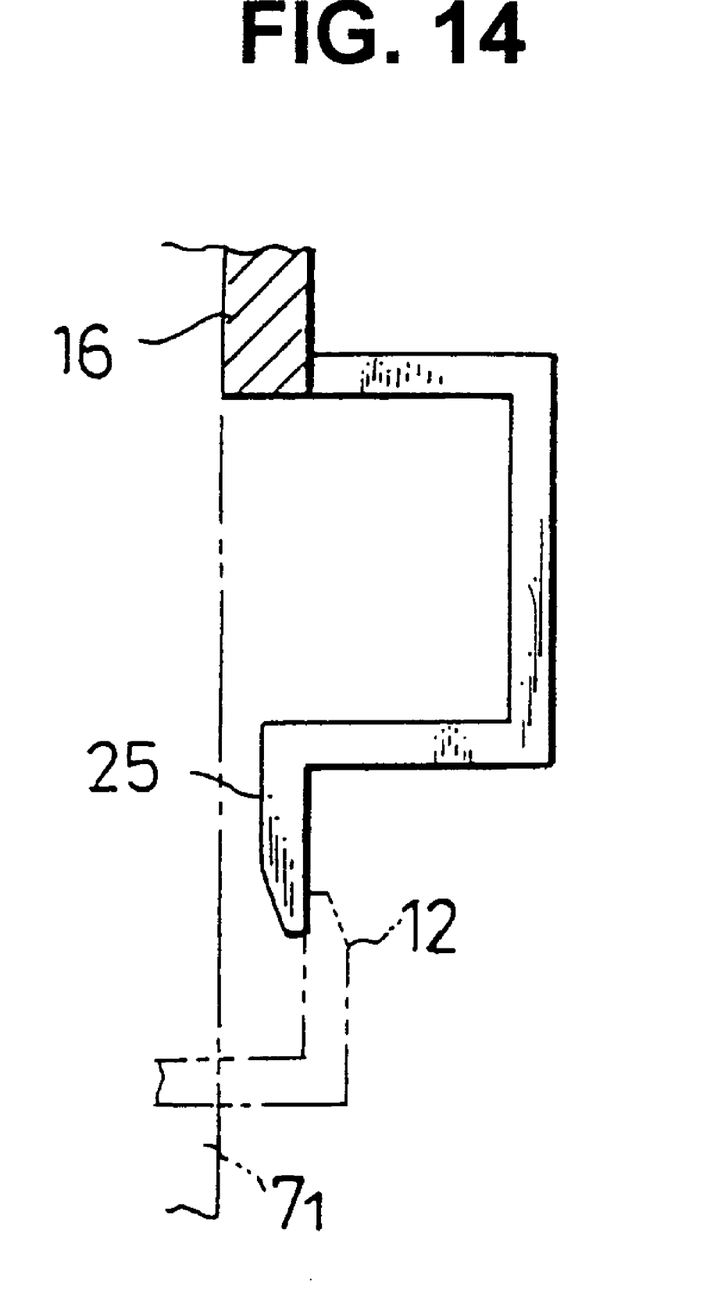
FIG. 14 is an enlarged side elevation view showing a portion indicated at R in FIG. 12B.

More particularly, the fiber cable storage casings 7, as shown in FIG. 6 and FIGS. 7A and 7B, each include a tray body $7_1$ and a cover $7_2$ pivotally mounted on the tray body $7_1$ by means of a hinge $7_3$. The connector holders 8 for connection of a plurality of cable fibers and the excessive fiber receiver 9 for receiving an excessive fiber of each of the cable fibers led out of the connectors received in the lower connector holder 8 or the connectors fitted in the upper connector holder 8 through the cassette 28 are arranged in the tray body $7_1$. The tray body $7_1$ is provided on one side of an outer surface thereof with a pair of hinge supports 10 and a pair of hinge support pins 11 in a manner to project therefrom. Thus, the hinge supports 10 on each tray body $7_1$ are fitted on the hinge support pins 11 on the adjacent tray body $7_1$, resulting in the tray bodies $7_1$ being pivotally and detachably connected to each other, so that a plurality of the fiber cable storage casings 7 may be stackedly arranged on each other. Also, the tray bodies $7_1$ are each provided on the outer surface thereof with holding pawls 12 and pawl receivers 13 for detachably receiving the holding pawls 12 therein, respectively.

The tray bodies $7_1$ are each formed with a flat box-like shape and provided at both ends thereof with fiber lead-in and lead-out sections or fiber access sections 14 and 15 through which cable fibers are led out or led in with respect to the fiber cable storage casing 7. The tray body $7_1$ is provided therein with a plurality of raised walls $8_1$, partition walls $8_2$ on which cable fibers are wound, and fiber holding elements $8_3$. The raised walls $8_1$ are arranged in a manner to be opposite to an inner surface of a side or peripheral wall thereof and spaced from each other at predetermined intervals, to thereby compartmentalize the connector holder 8. The partition walls $8_2$ and fiber holding elements $8_3$ cooperate with each other to provide the excessive fiber receiver 9. Also, one of the tray bodies $7_1$ is constructed so as to be detachably held on a tray fixing stand base 16 by a one-touch operation. The cover $7_2$ of each of the fiber cable storage casings 7 is provided with a pair of holding pawls $7_4$, which are detachably fitted in holding holes $7_5$ formed on the side or peripheral wall of the tray body $7_1$.

In the illustrated embodiment, the fiber access sections 14 and 15 are arranged on one side of the tray body $7_1$. Alternatively, these may be arranged on both sides of the tray body $7_1$. Thus, in this instance, the sections 14 and 15 are arranged on four corners of the tray body $7_1$.

Figure 1:
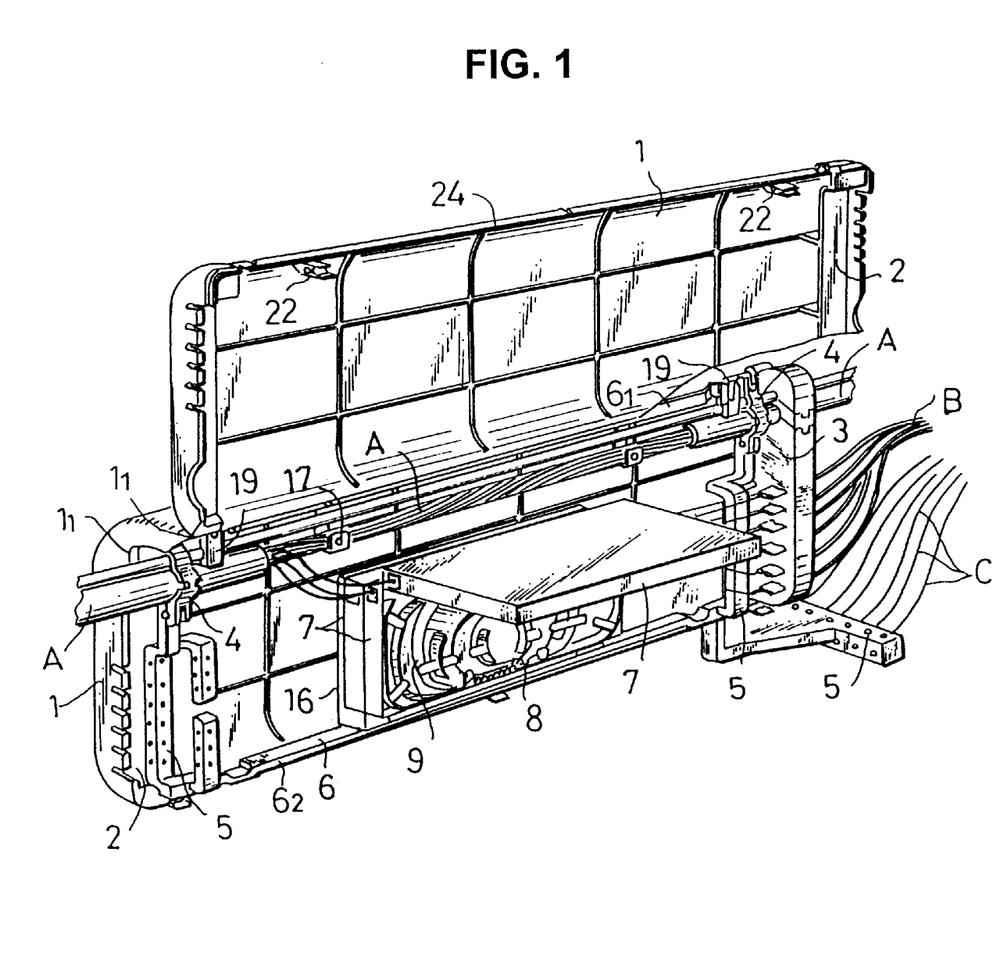
FIG. 1 is a developed perspective view generally showing an embodiment of a closure for cable connection according to the present invention which is in use.
Figure 5A:
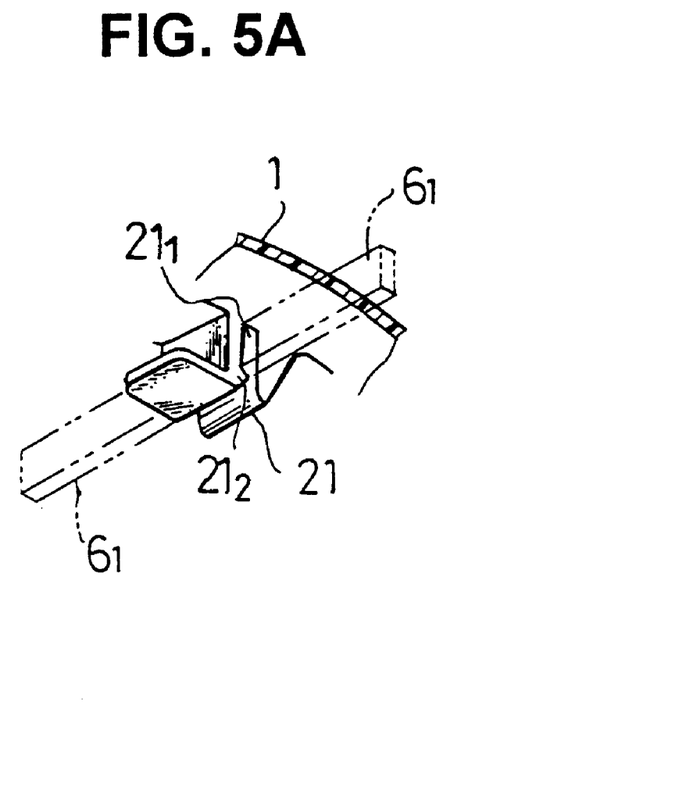
FIG. 5A is a fragmentary perspective view showing an upper connection fitment mounting section which constitutes a part of the sleeve shown in FIG. 4.
Figure 5B:
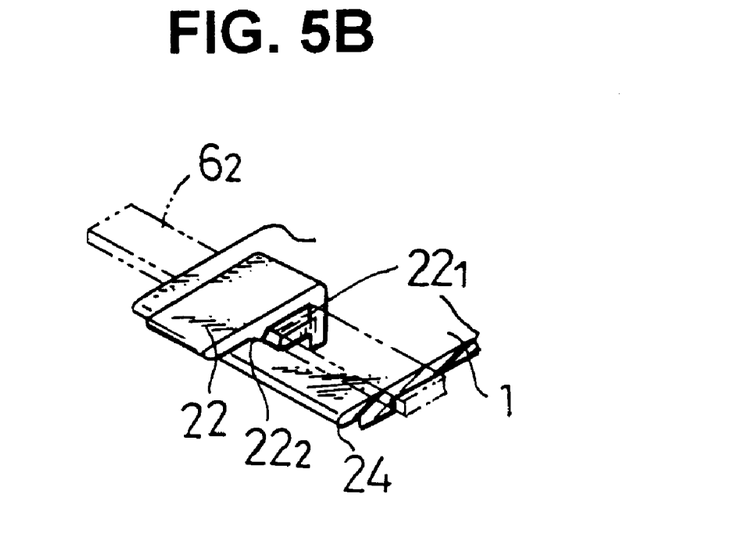
FIG. 5B is a fragmentary perspective view showing a lower connection fitment mounting section which constitutes a part of the sleeve shown in FIG. 4.

The tray fixing stand base 16 is fixedly raisedly mounted on the connection fitment 6 as shown in FIG. 1. The connection fitment 6, as shown in FIG. 3, includes an upper connection member $6_1$ and a lower connection member $6_2$ each arranged so as to extend over a substantially whole length of the sleeve 1. The upper and lower connection members $6_1$ and $6_2$ are connected at both ends thereof to each other by means of coupling members integrally joined to both upper and lower connection members $6_1$ and $6_2$, thus, the connection fitment 6 is integrally formed into a frame-like configuration. In the illustrated embodiment, the coupling members are each provided by a combination of the cable clamp 4 and tension member holder 5 arranged along the end plate 3. The upper connection member $6_1$ is provided on each of both sides thereof with a drawing-in fiber holder 17 for the cable, a mounting section of a clamp arm 18 of the cable clamp 4 and a support wire clamp 19. The lower connection member $6_2$ is provided with mounting sections 20 for the tray fixing stand base 16. The upper and lower connection members $6_1$ and $6_2$ thus constructed, as shown in FIGS. 4 to 5B, are detachably fittedly mounted on a pair of the first connection fitment mounting sections 21 provided on an upper portion of the inner surface of the sleeve 1 so as to be spaced from each other at a suitable interval and a pair of the second connection fitment mounting sections 22 likewise provided on a lower portion thereof, by a one-touch operation, respectively. The connection fitment mounting sections 21 and 22 are formed with recesses $21_1$ and $22_1$ in which the upper and lower connection members $6_1$ and $6_2$ of the connection fitment 6 are fitted, respectively. The recesses $21_1$ and $22_1$ are provided on respective open ends thereof with respective stoppers $21_2$ and $22_2$ for preventing the connection fitment 6 from being removed or detached from the recesses $21_1$ and $22_1$.

The fiber cable storage casing 7 is adapted to receive fiber connection sections and excessive fibers therein. It is constructed so as to safely and densely receive the fiber connection sections and excessive fibers therein while minimizing bending of cable fibers inserted thereinto through a cable insertion section thereof and substantially preventing torsion of the fibers. More specifically, the fiber cable storage casing 7 ensures that a bend radius of each excessive fiber of a predetermined level or less is increased to a level of 30 mm or more and accomplishes receiving of cable fibers (including exchanging fibers) in a one ribbon/one tray manner, to thereby improve management of a connection receiving unit. Also, the fiber cable storage casing 7 provides identification of areas for receiving fibers of an outdoor cable therein, satisfactorily attains drawing-out the fibers of the outdoor cable and drawing-out of any optional fibers without removing or detaching a fiber ribbon, eliminates replacement of internal parts depending on a working environment or position and permits hinged operation thereof to be accomplished to eliminate incorporation of inconvenient parts of mirror images therein, resulting in a cost for cable connection being significantly reduced.

The fiber access sections 14 and 15 are each constructed of tongue-like holding ribs alternately arranged between compartment walls provided at a corresponding one of corners of the tray body $7_1$, so that arrangement of the cover $7_2$ on the tray body $7_1$ may permit an opening for fiber access to be formed on a side surface of the fiber cable storage casing 7. The partition walls $8_2$ of the connector holder 8 permit the excessive fiber receiver 9 for windingly receiving the excessive fibers therein to be defined around the inner surface of the side or peripheral wall of the tray body $7_1$. Also, the tray body $7_1$ is provided with a plurality of the fiber holding elements $8_3$ so as to extend into the excessive fiber receiver 9. Further, the tray body $7_1$ is provided with the mounting section which is constructed of the hinge support pins 11 and holding pawls 12, so that the casing 7 may be secured to the tray fixing stand base 16 fixedly mounted on the connection fitment 6 by a one-touch operation (FIGS. 6 to 10).

The tray fixing stand base 16, as shown in FIGS. 11 to 14, is provided on each side of a lower end thereof with a mounting section $16_1$, which is screwed on the connection fitment 6. Also, the tray fixing stand base 16 is provided on an upper end thereof with a pair of hinge holders 26 for holding the hinge support pins 11 therein and on both sides of an intermediate portion thereof with holders 25 for holding the holding pawls 12 of the fiber cable storage casing 7 therein. Such construction of the tray fixing stand base 16 permits the tray body $7_1$ to be detachably mounted on the tray fixing stand base 16 by a one-touch operation.

The fiber cable storage casing 7 may be made of synthetic resin by injection mold and formed into any suitable configuration such as a substantially square shape, a rectangular shape or an elliptic shape in plan. The excessive fiber receiver 9 is constructed in such a manner that the fiber holding elements $8_3$ are arranged at predetermined intervals so as to permit cable fibers to be received in the receiver 9 in a loop-like manner, to thereby keep transmission characteristics of the fibers from being deteriorated.

In this instance, it is preferable that the excessive fiber receiver 9 be formed along the peripheral side wall of the tray body $7_1$, the partition walls $8_2$ and the connector holder 8, and the fiber holding elements $8_3$ be arranged at suitable intervals while extending into the excessive fiber receiver 9.

A fiber connection operation is carried out in a manner to expose a portion of first cable fibers between the cable clamps 4 and 4 for fixing a multi-fiber cable jacket while keeping the sleeve 1 open at the joint edges thereof, connect the exposed fibers to second cable fibers by means of connectors, windingly receive an excessive fiber of each of the cable fibers in the excessive fiber receiver 9 of the fiber cable storage casing 7 and hold the connectors in the connector holder 8. Thus, the illustrated embodiment permits connection of the fibers and confirmation of the connection to be facilitated.

Thus, the fiber connection operation is carried out by connecting the first and second cable fibers to each other by means of the connectors or the like, securely fitting the connectors in the connector holder 8, arranging excessive fibers extending from the connectors in the excessive fiber receiver 9 while bending them in a loop-like shape and holding them in the tray body $7_1$ by means of the fiber holding elements $8_3$, putting the cover $7_2$ on the tray body $7_1$, and stacking the fiber cable storage casings 7 on each other. Thus, the illustrated embodiment permits fiber connection sections to be individually fitted in the connector holder 8, to thereby positively prevent instantaneous transmission failure. Also, straight access of an optical fiber ribbon or a single optical fiber through the fiber access sections 14 and 15 to the closure permits setting of the closure to be carried out without deteriorating transmission characteristics of the fibers and leads to reducing in size thereof.

The above-described construction of the fiber cable storage casings 7 permits the fiber cable storage casings 7 to be pivotally connected to each other by a one-touch operation and without using any tool, excessive fibers to be received in the fiber cable storage casing 7 to keep the fibers from slacking and transmission characteristics of a cable from being deteriorated, and handling of an excessive fiber of each of the cable fibers to be significantly facilitated.

It is preferable that the sleeve 1 be securely provided on a portion of the inner surface thereof opposite to each of the end plates 3 with the cable clamp 4 including the clamp arm 18 arranged along the cable, the tension member holder 5, and the connection fitment 6 including the support wire clamp 19. Also, the sleeve 1 may be provided with buckles for fastening the joint edges of the sleeve 1 together. In addition, the sleeve 1 may have a band detachably wound on an outer surface thereof to further enhance sealing between the joint edges, as desired.

In the illustrated embodiment, the sleeve 1 is constructed so as to keep a space between the end plates 3 airtight while being expandable. Alternatively, it may be so constructed that the joint edges are integrally connectable to each other through any suitable fixing means. For example, the joint edges on one side of the sleeve in the longitudinal direction thereof may be connected to each other by means of a fixing hinge or a detachable hinge and those on the other side may be provided thereon with buckles for both fastening and tightening.

Further, it is preferable that the end plates 3 be made of an elastic rubber material of an elliptic shape, a circular shape or the like and formed with a plurality of cable insertion holes each provided with a thin-wall cap or a slit so that selective removal of the cap or slit permits the cable insertion hole to be open, resulting in an outside of the end plate and an inside thereof communicating with each other therethrough.

In the illustrated embodiment, a through-hole or a cable lead-out hole which is defined by the cable insertion hole 31 described above may be sealed by means of the adapter 33. Alternatively, sealing of the cable insertion hole 31 may be carried out by means of a spacer made of rubber or an airtight tape wound on an outer periphery of the cable inserted through the cable insertion hole 31.

The cable clamp 4 includes a receiving member formed integrally with the connection fitment 6 and provided with a cable insertion recess and the clamp arm 18 formed in conformity to an outer periphery of the cable and pivotally and detachably mounted on the receiving member by means of a pin so as to be opened and closed with respect to the receiving member, so that the cable is fixed by means of screws while being interposed between the receiving member and the clamp arm 18. Such construction of the cable clamp 4 facilitates clamping of the cable.

Now, the manner of assembling of the closure of the illustrated embodiment thus constructed will be described.

First, cables are each fitted thereon with the adapter 33. Alternatively, a cable seal material is wound on each of the cables. Then, a jacket of an end of each of the cables is fixed by the cable clamp 4 and then the mutual fit engagements 23 and 24 of the joint edges of the sleeve 1 are engaged with each other while arranging a seal material on a joint surface of each of the end plates 3 and arranging a gasket between the joint edges of the sleeve 1 as required. Also, as required, the buckles arranged on the outer surface of the sleeve 1 is tightened to enhance airtightness of the sleeve 1 over a whole length thereof, to thereby ensure sealing of the sleeve 1.

Under such assembling conditions, the gasket arranged between the joint edges of the sleeve 1 as required provides the sleeve with increased airtightness while keeping clamping force which is applied to the sleeve considerably reduced. Also, arrangement of the seal material such as the adapter 33 between each of the end plates 3 and the cable further enhances airtightness of the sleeve.

Release of the sleeve 1 from fastening thereof is carried out by releasing fastening of the buckles and releasing one-touch locking between the mutual fit engagements 23 and 24 of the joint edges of the sleeve 1. Then, the joint edges are separated from each other to expose each of the fiber cable storage casings 7, resulting in replacement of the cable being facilitated.

Furthermore, the fiber cable storage casings 7 are pivotally connected to each other by merely pressedly fitting the hinge supports 10 of each fiber cable storage casing on the hinge support pins 11 of the fiber cable storage casing 7 adjacent thereto. Also, the fiber cable storage casings 7 are stackedly held on each other by press fitting between the holding pawls 12 of each tray body $7_1$ and the pawl receivers 13 of the adjacent tray body $7_1$, so that fiber connection operation and fiber aligning operation may be facilitated while minimizing or substantially eliminating use of a tool.

The above-described construction of the illustrated embodiment permits a number of cable fiber connections to be safely and densely received in the fiber cable storage casings. Also, the embodiment permits the fiber connection operation to be realized by opening the sleeve 1 to expose a portion of the fibers between the clamps, to thereby accomplish connection between fibers, receiving excessive fibers in the excessive fiber receiver and receiving connectors in the connector holder. Thus, fiber connection operation can be executed while being confirmed. Also, the embodiment permits detachable connection between the fiber cable storage casings to be carried out by a one-touch operation and without using any tool and an optical fiber ribbon or a single optical fiber to be straightly led out of the fiber cable storage casing, resulting in the closure being reduced in size thereof irrespective of the straight type or capsule type. Further, arrangement of the fiber cable storage casings in a manner to be superposed on each other increases the number of fiber connection sections, prevents slack of the fibers after fiber connection operation and keeps transmission characteristics of the cable from being deteriorated while facilitating handling of the excessive fibers.

As can be seen from the foregoing, the closure for cable connection according to the present invention effectively prevents deformation of the sleeve, to thereby render a posture of the sleeve stable while facilitating handling of the sleeve. Also, the closure not only facilitates incorporation and setting of cables therein and exhibits increased safety and airtightness but substantially improves assembling of the sleeve. Moreover, the present invention permits cable connection operation to be readily carried out substantially without using any tool, to thereby be significantly improved.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A closure for cable connection comprising:
   a sleeve of cylindrical shape in a longitudinal direction into which a cable is introduced, said sleeve having an inner surface defining an interior region and a predetermined length along said longitudinal direction;
   a connection fitment arranged in said sleeve and extending over substantially said entire predetermined length of said sleeve;
   a cable connection mechanism arranged in said sleeve to carry out connection and fixing of the cable, said cable connection mechanism being mounted on said connection fitment; and
   a plurality of connection fitment mounting sections integrally formed with and spaced apart along said longitudinal direction of said inner surface of said sleeve and completely contained within said interior region of said sleeve; said connection fitment being detachably connected to said connection fitment mounting sections.

2. A closure for cable connection as defined in claim 1, wherein said connection fitment includes an upper connection member and a lower connection member each arranged so as to extend in a longitudinal direction of said sleeve; and
   said connection fitment mounting sections are provided on upper and lower portions of said inner surface of said sleeve in a manner to project therefrom, respectively.

3. A closure for cable connection as defined in claim 2, wherein said connection fitment further includes coupling members for coupling both ends of said upper and lower connection members to each other;
   said coupling members being formed in a manner to be integral with said upper and lower connection members, resulting in said connection fitment being generally formed into a frame-like configuration.

4. A closure for cable connection as defined in claim 3, wherein said connection fitment mounting sections are provided with recesses, respectively, in which said connection fitment is fitted;
   said recesses having respective open ends provided with respective stoppers for keeping said connection fitment from being released from said recesses.

5. A closure for cable connection as defined in claim 3, further comprising end plates fittedly mounted on both ends of said sleeve;
   said cable connection mechanism including a cable clamp for fixing the cable and a tension member holder each arranged along a corresponding one of said end plates;
   said cable clamp and tension member holder being integrally formed on said connection fitment.

6. A closure for cable connection as defined in claim 5, wherein said cable clamp and tension member holder constitute each of said coupling members of said connection fitment.

7. A closure for cable connection as defined in claim 3, wherein said sleeve is split in an axial direction thereof at one part thereof in a circumferential direction thereof, resulting in it being formed with joint edges;
   said sleeve is provided with at least one hinge positioned on a part thereof opposite to said joint edges; and
   said sleeve is provided with mutual fit engagements positioned along said joint edges;
   said joint edges being joined to each other by engagement between said mutual fit engagements.

8. A closure for cable connection as defined in claim 2, wherein said connection fitment mounting sections are provided with recesses, respectively, in which said connection fitment is fitted;
   said recesses having respective open ends provided with respective stoppers for keeping said connection fitment from being released from said recesses.

9. A closure for cable connection as defined in claim 2, wherein said sleeve is split in an axial direction thereof at one part thereof in a circumferential direction thereof, resulting in it being formed with joint edges;
   said sleeve is provided with at least one hinge positioned on a part thereof opposite to said joint edges; and
   said sleeve is provided with mutual fit engagements positioned along said joint edges;
   said joint edges being joined to each other by engagement between said mutual fit engagements.

10. A closure for cable connection as defined in claim 1, wherein said sleeve is split in an axial direction thereof at one part thereof in a circumferential direction thereof, resulting in it being formed with joint edges;
    said sleeve is provided with at least one hinge positioned on a part thereof opposite to said joint edges; and
    said sleeve is provided with mutual fit engagements positioned along said joint edges;
    said joint edges being joined to each other by engagement between said mutual fit engagements.

11. A closure for a cable connection as defined in claim 1 wherein said connection fitment mounting sections are provided with recesses whereby said connection fitment is detachably fitted thereon.

12. A closure for cable connection as defined in claim 11, wherein said
    recesses having respective open ends provided with respective stoppers for keeping said connection fitment from being released form said recesses.

13. A closure for cable connection as defined in claim 12, wherein said sleeve is split in an axial direction thereof at one part thereof in a circumferential direction thereof, resulting in it being formed with joint edges;
    said sleeve is formed with at least one hinge positioned on a part thereof opposite to said joint edges; and
    said sleeve is provided with mutual fit engagements positioned along said joint edges;
    said joint edges being joined to each other by engagement between said mutual fit engagements.

14. A closure for cable connection comprising:
    a sleeve of cylindrical shape into which a cable is introduced, said sleeve having an inner surface defining an interior region;
    end plates fittedly mounted on both ends of said sleeve;
    a connection fitment arranged in said sleeve, said connection fitment including an upper connection member and a lower connection member each arranged so as to extend in a longitudinal direction of said sleeve, and coupling members for coupling both ends of said upper and lower connection members to each other, said coupling members being formed in a manner to be integral with said upper and lower connection members, resulting in said connecting fitment being generally formed into a frame-like configuration;
    a cable connection mechanism arranged in said sleeve to carry out connection and fixing of the cable, said cable connection mechanism being mounted on said connection fitment and including a cable clamp for fixing said cable, and a tension member holder, each arranged along a corresponding one of said end plates, said cable clamp and tension member holder being integrally formed on said connection fitment, and at least one fiber cable storage casing for receiving a fiber connection section of each of cable fibers let out of said cable fixed by said cable clamp and an excessive fiber connected to said fiber connection section, said upper connection member of said connection fitment including a drawing-in fiber holder for said cable, a mounting section of a clamp arm of said cable clamp and a support wire clamp, said lower connection member including a mounting section of a fixing member of said fiber cable storage casing; and a plurality of connection fitment mounting sections provided on the upper and lower portions of said inner surface of said sleeve in a manner to project therefrom and completely contained within said interior region of said sleeve; said connection fitment being detachably connected to said connection fitment mounting sections.

15. A closure for cable connection as defined in claim 14, wherein said fiber cable storage casing includes a tray body and a cover pivotally mounted on said tray body through a hinge, respectively;

said tray body including a connector holder for receiving therein a plurality of connectors connecting the cable fibers and an excessive fiber receiver for holding the excessive fiber of each of the cable fibers led out of the connectors received in said connector holder while drawing the excessive fibers around;

said tray body being provided on an outer surface of a peripheral wall thereof with hinge supports and hinge support pins;

said hinge supports of the tray body being fitted on said hinge support pins of an adjacent tray body to pivotally detachably connect the tray bodies to each other;

said tray body being provided on the outer surface thereof with holding pawls and pawl receivers through which the tray bodies adjacent to each other are detachably connected to each other.

16. A closure for cable connection as defined in claim 15, wherein said fixing member comprises a tray fixing stand base for detachably holding one of said tray bodies.

17. A closure for cable connection as defined in claim 16, wherein said tray fixing stand base is raisedly fixedly provided on said connection fitment and includes hinge holders;

said hinge holders being fitted on said hinge support pins of said one tray body.

18. A closure for cable connection as defined in claim 17, wherein said tray fixing stand base includes hinge holders;

said hinge holders being engaged with said holding pawls of said tray body.

19. A closure for cable connection as defined in claim 15, wherein said tray body is formed with a substantially rectangular shape like a box and provided on said outer surface of said peripheral wall thereof with fiber access sections;

said tray body is provided therein with raised walls in a manner to be opposite to an inner surface of said peripheral wall thereof and spaced from each other at predetermined intervals so as to compartmentalize said connector holder; and said tray body is provided therein with partition walls which define said excessive fiber receiver and on which the fiber is wound.

20. A closure for cable connection as defined in claim 19, wherein said tray body is provided on said peripheral wall and partition walls thereof with fiber holding elements in a manner to extend into said excessive fiber receiver.

21. A closure for cable connection comprising:

a sleeve of cylindrical shape into which a cable is introduced, said sleeve having an inner surface defining an interior region;

end plates fittedly mounted on both ends of said sleeve;

a connection fitment arranged in said sleeve, said connection fitment including an upper connection member and a lower connection member each arranged so as to extend in a longitudinal direction of said sleeve and including coupling members for coupling both ends of said upper and lower connection members to each other, said coupling members being formed in a manner to be integral with said upper and lower connection members, resulting in said connection fitment being generally formed into a frame-like configuration;

a cable connection mechanism arranged in said sleeve to carry out connection and fixing of the cable, said cable connection mechanism being mounted on said connection fitment and including a cable clamp for fixing said cable, and a tension member holder, each arranged along a corresponding one of said end plates, said cable clamp and tension holding member being integrally formed on said connection fitment and constituting each of said coupling members of said connection fitment, said cable connection mechanism further including at least one fiber cable storage casing for receiving a fiber connection section of each of cable fibers let out of said cable fixed by said cable clamp and an excessive fiber connected to said fiber connection section, said upper connection member of said connection fitment including a drawing-in fiber holder for said cable, a mounting section of a clamp arm of said cable clamp and a support wire clamp, said lower connection member including a mounting section of a fixing member of said fiber cable storage casing; and a plurality of connection fitment mounting sections provided on said upper and lower portions of said inner surface of said sleeve in a manner to project therefrom and completely contained within said interior region of said sleeve; said connection fitment being detachably connected to said connection fitment mounting sections.

22. A closure for cable connection as defined in claim 21, wherein said fiber cable storage casing includes a tray body and a cover pivotally mounted on said tray body through a hinge, respectively;

said tray body including a connector holder for receiving therein a plurality of connectors connecting the cable fibers and an excessive fiber receiver for holding the excessive fiber of each of the cable fibers led out of the connectors received in said connector holder while drawing the excessive fibers around;

said tray body being provided on an outer surface of a peripheral wall thereof with hinge supports and hinge support pins;

said hinge supports of the tray body being fitted on said hinge support pins of an adjacent tray body to pivotally detachably connect the tray bodies to each other;

said tray body being provided on the outer surface thereof with holding pawls and pawl receivers through which the tray bodies adjacent to each other are detachably connected to each other.

23. A closure for cable connection as defined in claim 22, wherein said fixing member comprises a tray fixing stand base for detachably holding one of said tray bodies.

24. A closure for cable connection as defined in claim 23, wherein said tray fixing stand base is raisedly fixedly provided on said connection fitment and includes hinge holders;

said hinge holders being fitted on said hinge support pins of said one tray body.

25. A closure for cable connection as defined in claim 22, wherein said tray body is formed with a substantially rectangular shape like a box and provided on said outer surface of said peripheral wall thereof with fiber access sections;

said tray body is provided therein with raised walls in a manner to be opposite to an inner surface of said peripheral wall thereof and spaced from each other at predetermined intervals so as to compartmentalize said connector holder; and said tray body is provided therein with partition walls which define said excessive fiber receiver and on which the fiber is wound.

* * * * *